J. M. MURRAY.
NUT AND BOLT TIGHTENING DEVICE.
APPLICATION FILED JULY 10, 1918.
1,290,296.
Patented Jan. 7, 1919.
2 SHEETS—SHEET 1.
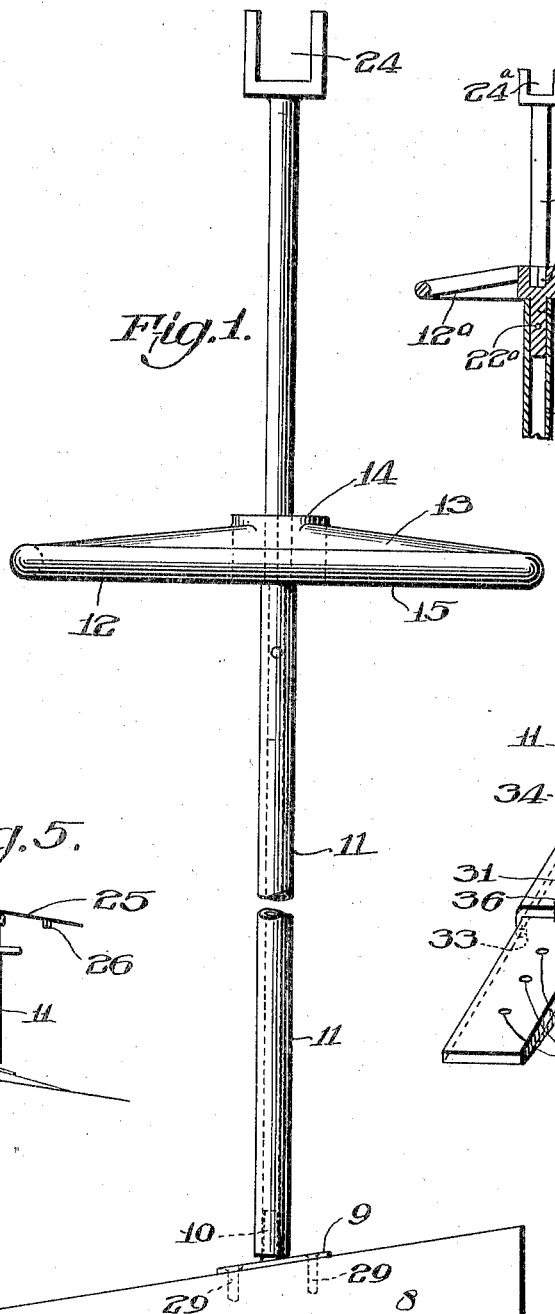
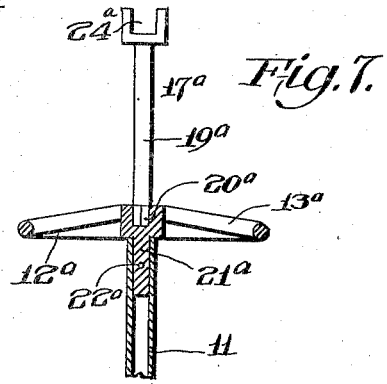
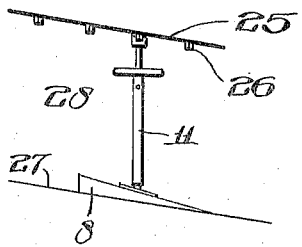
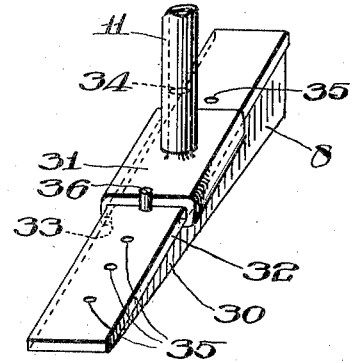
Witnesses:
E. E. Reichart
M. A. Inglar
Inventor
John M. Murray
By Joshua R. H. Potts
His Attorney

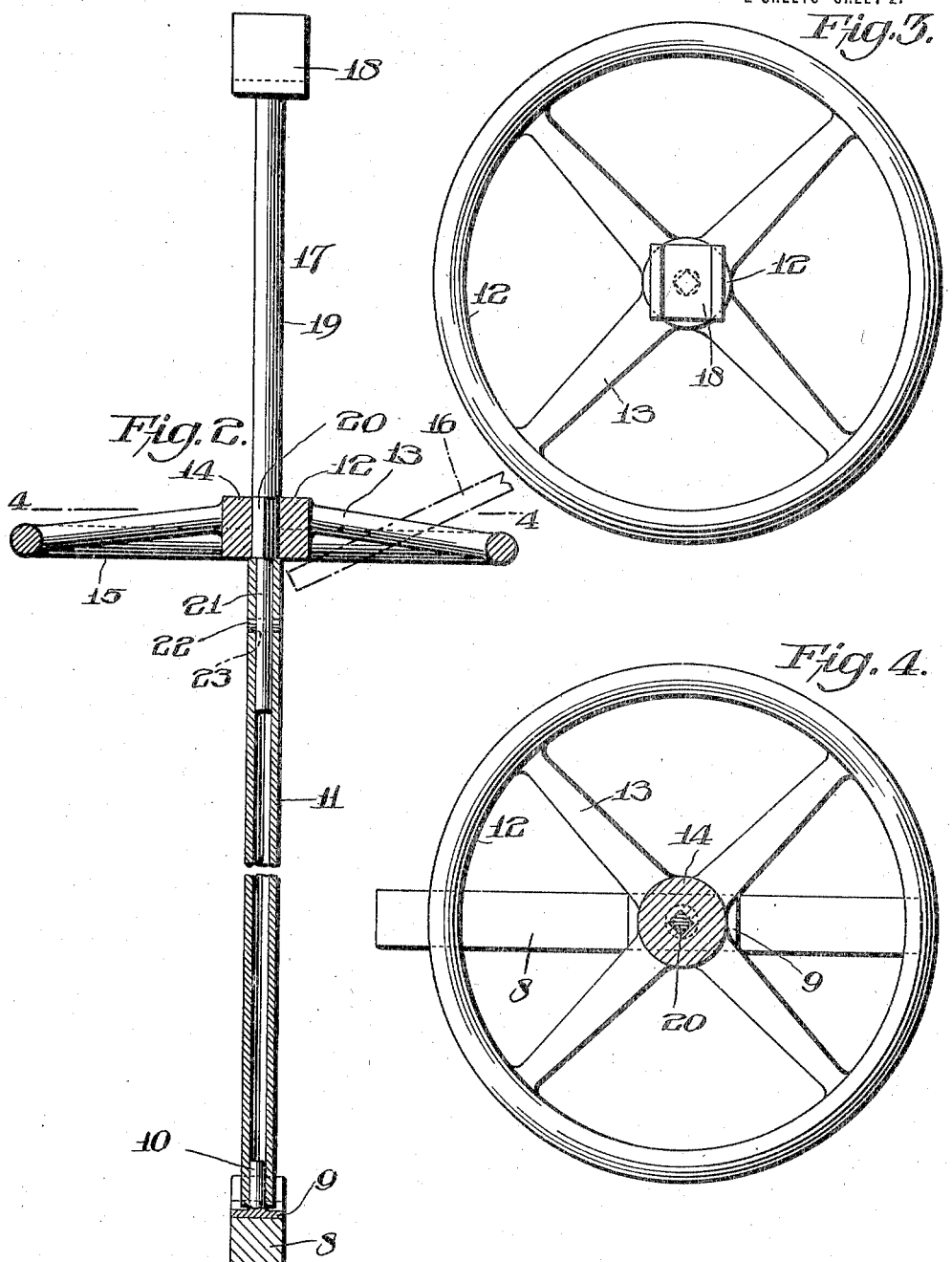

UNITED STATES PATENT OFFICE.

JOHN MARSHALL MURRAY, OF PHILADELPHIA, PENNSYLVANIA.

NUT AND BOLT TIGHTENING DEVICE.

1,290,296.     Specification of Letters Patent.     Patented Jan. 7, 1919.

Application filed July 10, 1918. Serial No. 244,134.

*To all whom it may concern:*

Be it known that I, JOHN M. MURRAY, a citizen of the United States, residing at Philadelphia, in the county of Philadelphia and State of Pennsylvania, have invented certain new and useful Improvements in Nut and Bolt Tightening Devices, of which the following is a specification.

One object of my invention is to provide a device for tightening nuts and bolts which are located in places where it is impossible to secure good leverage with ordinary wrenches. For example, my invention is well adapted for use in tightening nuts and bolts on the bottoms of ships where there is usually a great number of bolts and the working space is extremely limited.

Another object is to so construct the device of my invention that it can be quickly positioned and operated.

A further object is to make the device of my invention of a simple and durable construction.

These objects, and other advantageous ends which will be described hereinafter, I attain in the following manner, reference being had to the accompanying drawings in which—

Figure 1 is a front elevation of my invention,

Fig. 2 is a sectional elevation; the wrench and its associated parts being shown in outside elevation, Fig. 3 is a top plan view of my invention, Fig. 4 is a transverse section taken on the line 4—4 of Fig. 2, Fig. 5 is a diagrammatic elevation showing how my invention is adapted for use for tightening bolts on the bottom of a ship, Fig. 6 is a fragmentary perspective view showing a slight modification of a portion of my invention, and Fig. 7 is a fragmentary sectional elevation showing a modification in the construction of certain other features of my invention.

Referring to Figs. 1 to 5, inclusive, my invention includes a wedge block 8 having a shoe plate 9 on its upper surface, said wedge being provided with an upright stud 10 which fits within the lower end of a tube or pipe 11. The tube or pipe 11 forms a standard which is rotatably mounted on the stud 10 and at its upper end provides a bearing for a lever 12 illustrated in the form of a wheel. This wheel is preferably made with its spokes 13 extending at an angle downwardly from the hub 14 so that the rim 15 of the wheel is in a lower horizontal plane than the horizontal plane which includes the junction of the spokes with the hub. This permits an auxiliary lever rod 16 to be inserted between the spokes at a comparatively slight angle to the horizontal. This auxiliary lever rod is illustrated in dot-and-dash lines at 16 in Fig. 2 of the drawing.

The advantage of having the auxiliary lever rod 16 extending at an angle is obviously to keep the lever rod at a comparatively low level so as to permit it to be easily manipulated.

A wrench 17 includes an angular nut-engaging head 18, and a stem 19. This stem has a portion 20, angular in cross section, which fits an angular hole in the hub 14 of the wheel 12. Another portion 21 of the stem 19 fits within the upper end of the tube or pipe 11 and a key pin 22 extends through the pipe 11 and through a hole 23 in the portion 21 of the stem 19. It will thus be noted that the wheel 12 is positively connected to the wrench 17 and to the standard 11 so that by rotating the wheel 12 the wrench will be rotated and the standard 12 will be also rotated on the stud 10.

The wrench head 18 is preferably made with an opening as shown at 24 so that when the wrench is applied to a nut the operator can see the nut through the opening 24. As illustrated in Fig. 5, 25 represents the bottom of a boat or ship having nuts 26 to be tightened, and 27 represents the base or supporting structure.

The space 28 is the space provided for the workmen and it is within this space and upon the base 27 that I mount my invention in order to tighten the nuts 26. The device can be inserted under each nut and by turning the wheel 12 the nuts will be tightened.

The block 8 can be kicked into position by the workmen so that the standard 11 will occupy a substantially upright position irrespective of the slight angle of the bottom of the boat and the base 27. The loose connection between the stud 10 and the standard 11 will permit rotation of the standard and wrench and if desired the shoe plate 9 can be moved into different positions throughout the length of the wedge to increase or decrease the distance between the wrench head and the base 27.

In Figs. 1 to 5, inclusive, I have illustrated the shoe plate 9 secured to the block by lag screws 29. However, it will be understood that any suitable securing mechanism can be employed.

In Fig. 6 I have illustrated a wedge block 30 upon which is sildable a shoe plate 31, said wedge block and shoe plate corresponding in function to the wedge block 8 and shoe plate 9, above described. However, in Fig. 6, the wedge block is provided with a top flange 32 and the shoe plate is provided with inwardly bent ears 33.

In this instance also the shoe plate 31 is provided with a stud 34 which is adapted to fit within the standard 11. It will thus be seen that with the construction shown in Fig. 6 by holding the standard 11 and by kicking the wedge block 30, the standard 11 will be raised or lowered according to the direction of movement of the wedge block. If desired, the wedge block can be provided with a series of holes 35 and a movable pin 36 can be employed to support the shoe 31 in various positions so as not to accidentally slide down the incline of the wedge after once being set.

In Fig. 7, instead of having the wrench stem extending entirely into the standard 11, I provide the wheel 12$^a$ with a stem 21$^a$ which fits within the standard, and a key 22$^a$ is provided to lock the stem 21$^a$ to the standard 11. In this construction the stem 19$^a$ of the wrench 17$^a$ has its angular portion 20$^a$ fitting within the hub of the wheel 12$^a$ but does not extend entirely through said hub as in the construction illustrated in Figs. 1 to 4, inclusive.

By the use of my invention a workman can efficiently tighten a great many more nuts or bolts than with an ordinary wrench, and at the same time his work is easier since it is very tiresome to stand in a comparatively small space and in a cramped position as was necessary prior to the construction of my invention.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A device of the character described including a standard, a wrench at the top of the standard and in longitudinal alinement with the standard, means forming a rotatable support for the bottom of said standard, and a lever operatively connected to said wrench and standard, substantially as described.

2. A device of the character described including a standard, a wrench at the top of the standard, a block, a shoe on the block having a rotatable connection with said standard, and a lever interposed between said wrench and said block whereby, when the lever is rotated, the wrench will be rotated and the standard will also be rotated on said connection, substantially as described.

3. A device of the character described including a standard, a wrench at the top of said standard, a block, a shoe on the block having a stud rotatably fitting the lower end of said standard, and a lever interposed between said wrench and said block, substantially as described.

4. A device of the character described including a standard, a wrench at the top of the standard, a wedge block, a shoe mounted on said wedge block and supporting said standard, and a lever operatively connected to said wrench, substantially as described.

5. A device of the character described including a tubular standard, a wrench mounted above said standard, a lever operatively connected to the wrench and to said standard, a block, and means for supporting said standard on the block, substantially as described.

In testimony whereof I have signed my name to this specification in the presence of two subscribing witnesses.

JOHN MARSHALL MURRAY.

Witnesses:
 CHAS. E. POTTS,
 MARY A. INGLOR.